United States Patent [19]

Inoue

[11] Patent Number: 4,629,856

[45] Date of Patent: Dec. 16, 1986

[54] TRAVELING-WIRE BACKING SUPPORT EDM METHOD AND APPARATUS

[75] Inventor: Kiyoshi Inoue, Tokyo, Japan

[73] Assignee: Inoue-Japax Research Incorporated, Kanagawaken, Japan

[21] Appl. No.: 549,187

[22] Filed: Nov. 4, 1983

[30] Foreign Application Priority Data

Nov. 8, 1982 [JP] Japan .............................. 57-194695

[51] Int. Cl.[4] .......................... B23H 7/06; B23H 7/36
[52] U.S. Cl. ............................ 219/69 W; 204/129.5; 204/206; 219/69 D
[58] Field of Search .............. 219/69 M, 69 W, 69 E, 219/69 V, 69 D, 69 G; 204/224 M, 206, 129.1, 129.2, 129.25, 129.4, 129.5, 129.7; 83/651.1; 140/2, 147; 226/199, 200

[56] References Cited

U.S. PATENT DOCUMENTS

| | | | |
|---|---|---|---|
| 2,717,285 | 9/1955 | Rayburn | 204/206 |
| 3,035,150 | 5/1962 | Connoy | 219/69 W |
| 3,943,322 | 3/1976 | Lehmann et al. | 219/69 W |
| 4,121,080 | 10/1978 | Janicke | 219/69 W |
| 4,123,645 | 10/1978 | Shichida et al. | 219/69 W |
| 4,301,349 | 11/1981 | Inoue | 219/69 W |
| 4,527,035 | 7/1985 | Majestic | 219/69 D |

FOREIGN PATENT DOCUMENTS

| | | | |
|---|---|---|---|
| 2481177 | 10/1981 | France | 219/69 W |
| 44-15885 | 7/1969 | Japan | 219/69 V |
| 137842 | 10/1980 | Japan | 219/69 W |
| 265331 | 3/1970 | U.S.S.R. | 219/69 W |

Primary Examiner—A. D. Pellinen
Assistant Examiner—Geoffrey S. Evans
Attorney, Agent, or Firm—Karl F. Ross; Herbert Dubno

[57] ABSTRACT

A wire-cut EDM method and apparatus in which an electrode wire traveling between a pair of wire-positioning guide members is laterally advanced, generally tangentially along a workpiece contour disposed therebetween to electro-erosively cut a precision contour in the workpiece contour with a depth of cut at most equal to the diameter of the wire. The fluctuating machining pressure, induced by the gap erosive electrical discharges and fluid injection, tends to undulate the traveling wire in the open space flanking the contour being cut and to misalign the axial position thereof away from a prescribed path of advance in the cutting zone. A rotary mechanism, rotatable about its axis of rotation coinciding with the straight-line path established for the traveling wire axis between the wire positioning guide members, carries a wire-backing support member disposed in the cutting zone and having wire supporting surfaces parallel to that straight-line path to hold the traveling wire against the machining pressure, and is rotated to orient the wire-backing support member so as to oppose those surfaces with the area of contour being cut and to avoid a collision of the support member with the workpiece.

8 Claims, 3 Drawing Figures ered from a workpiece with due precision and surface finish. Such requirements are typical where a rough-shaped contour is to be finished in a secondary cutting arrangement. In such cases, as readily recognized, there is not brought about a bilateral flanking slot as described but there results a unilateral-flanking state in which one side of the advancing wire is always open-spaced. It has been found that the unilateral-flanking mode has both advantages and disadvantages. One advantage is that the machining detritus can hardly accumulate in the cutting zone so that erosive cutting proceeds quicker. One serious disadvantage is the lack of stability in wire position. The machining pressure which develops due to erosive discharges and fluid flushing in the gap tends to move the electrode wire away from an instantaneous area of the contour being cut, in a direction obliquely behind the path of wire advance and, by reason of its inherent fluctuation, tends to force the traveling wire to undulate in a plane transverse to that area of contour, hence causes a fluctuation of the wire axis in spite of the use of the wire-positioning guide members across the cutting zone. While this fluctuation is generally small in amplitude, it becomes no longer negligible where the machining surface finish required is as fine as 0.5 μRmax in roughness.

OBJECTS OF THE INVENTION

It is accordingly an important object of the present invention to provide a novel and improved traveling-wire EDM method and apparatus whereby the aforementioned problem in the prior art is effectively overcome.

Another important object of the invention is to provide a novel and improved traveling-wire EDM method whereby the unilateral-flanking mode is positively employed to enhance the traveling-wire EDM efficiency.

SUMMARY OF THE INVENTION

In accordance with the present invention there is provided, in a first aspect thereof, a traveling-wire EDM method which comprises: positioning a workpiece contour in juxtaposition with an electrode wire traveling axially along a straight-line path between a pair of wire-positioning guide members; translationally advancing the axially traveling wire, generally tangentially along the workpiece contour while effecting electrical discharges in a cutting zone flushed with a machining fluid between the traveling wire and the workpiece contour to cut a precision contour therein with a depth of cut being at most substantially equal to the diameter of the electrode wire whereby a fluctuating machining pressure caused between the traveling wire and an instantaneous area of contour being cut tends to force the traveling wire to undulate and laterally move away from the straight-line path in an essentially unilateral open space flanking the contour being cut; supporting the traveling wire tending to undulate, from behind and with rigid surfaces of an element which are elongated substantially in parallel to the said straight-line path and disposed in bearing contact with the traveling wire at least partly in the cutting zone, the element being carried on a rotary mechanism rotatable about its axis of rotation coinciding with the said straight-line path; and rotating the rotary mechanism about the said rotary axis to orient the element so as to oppose the said wire-supporting surfaces with the said instantaneous area of contour being cut and to avoid a collision of the element with the workpiece. Preferably, the said elongated surfaces have a wire-bearing length at least fifty times the diameter of the electrode wire in parallel to the straight-line path.

The invention also provides, in a second aspect thereof, a traveling-wire EDM apparatus which comprises: a pair of wire-positioning guide members for establishing a straight-line path therebetween to be traveled axially by an electrode wire in spaced juxtaposition with a workpiece contour; means for effecting a relative displacement between the workpiece and the guide members to translationally advance the traveling wire, generally tangentially along the workpiece contour while electrical discharges are effected in a cutting zone flushed with a machining fluid between the traveling wire and the workpiece contour to cut a precision contour therein with a depth of cut being at most substantially equal to the diameter of the electrode wire whereby a fluctuating machining pressure caused between the traveling wire and an instantaneous area of contour being cut tends to force the traveling wire to undulate and laterally remove away from the said straight-line path in an essentially unilateral open space flanking said contour being cut; a rotary mechanism having an element carried thereon which has rigid surfaces that are elongated substantially in parallel to the said straight line path and disposed in bearing contact with the traveling wire at least partly in the cutting zone, the said mechanism being rotatable about its axis of rotation coinciding with the said straight-line path;

and means for rotating the said mechanism about the said rotary axis to orient the said element so as to oppose the said wire-supporting surfaces with the said instantaneous area of contour being cut and to avoid a collision of the said element with the workpiece. The said wire-supporting surfaces are preferably arranged to constitute an elongate wire reception groove essentially V-shaped in cross section. The said element may then be formed with an inner bore opening to the said groove, and there may be provided suction means connected to the said bore for applying in the said groove a negative pressure tending to retain the traveling wire in the said groove.

Since the problem of the unilateral-flanking mode traveling-wire EDM process is thus effectively overcome, this mode can be positively employed to generally enhance the efficiency of a given cutting operation. Thus, for example, by repeating a unilateral-flanking mode, a layer of stock of a substantial thickness which is much greater than the diameter of the electrode wire can be effectively removed without the use of a bilateral slotting process as previously described.

BRIEF DESCRIPTION OF THE DRAWING

These and other features of the present invention as well as advantages thereof will become more readily apparent from the following description when taken with reference to the accompanying drawing in which.

SPECIFIC DESCRIPTION

Figure 1:
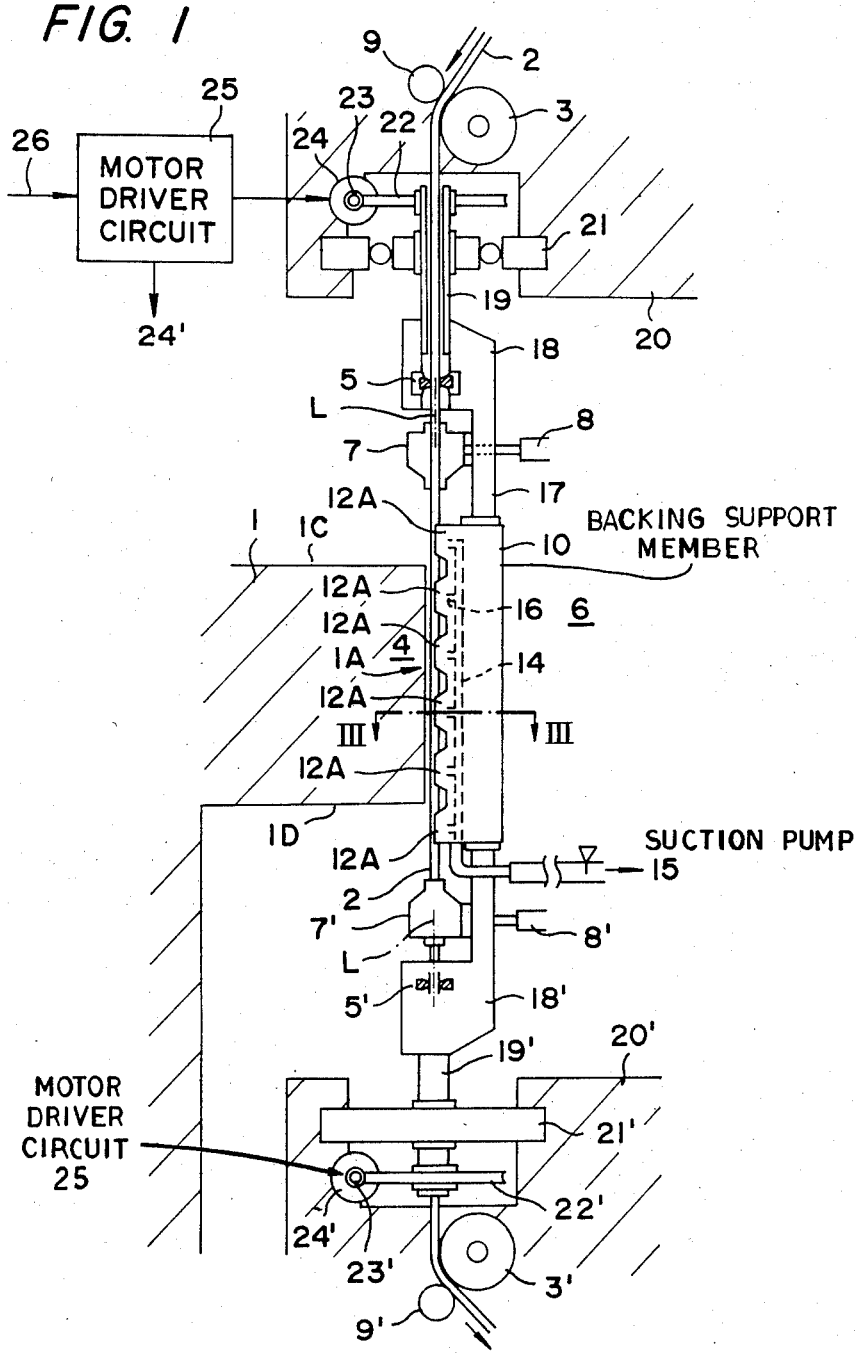
FIG. 1 is an elevational view essentially in section, diagrammatically illustrating an apparatus according to the present invention.

Referring now to FIG. 1 there is shown a traveling-wire EDM (electrical discharge machining) system for cutting a workpiece 1 generally tangentially along a contour 1A, which may be a rough-shaped or rough-cut contour to be finished, with a continuous electrode wire 2. The workpiece 1 is securely mounted on a compound worktable (not shown) of a conventional cross-feed design and is thereby displaceable in a horizontal or X—Y plane which is transverse to the electrode wire 2 extending vertically between guide rollers 3 and 3'. In the illustrated arrangement, the electrode wire 2 is dispensed over the upper guide roller 3 from supply means (not shown), transported axially downwards, and guided over the lower roller 3' onto takeup means (not shown). By means of a traction drive and a braking drive (both not shown) provided in the wire takeup and supply sides, respectively, the electrode wire 2 is caused to continuously travel at a suitable rate of axial travel under a suitable tension in a cutting zone 4 adjacent the workpiece 1 (contour 1A).

Across the cutting zone 4, it is necessary to provide a pair of wire-positioning guide members 5, 5' for establishing therebetween a straight-line path L for the electrode wire 2 so that the wire may travel precisely in alignment with this established path in electroerosive cutting relationship with the workpiece 1. Such wire-positioning guide members are commonly provided fixed in position on the conventional traveling-wire EDM machines. In the illustrated embodiment of this invention, these guide members 5, 5' are carried on a rotary mechanism 6 as will be described. The guide members 5, 5' are preferably composed of or lined with an electrically nonconductive and friction-resistant material such as ruby, sapphire, diamond or ceramic for bearing contact with the electrode wire 2.

A machining fluid, e.g. deionized water, for flushing the cutting zone 4 is typically supplied from one or more nozzles. Two such nozzles are shown at 7 and 7' as disposed, respectively, above and below the cutting zone 4 to project machining fluid streams coaxially with the traveling electrode wire 2 into the cutting zone 4. In the illustrated embodiment of the invention, these coaxial nozzles, 7, 7' may also be carried on the rotary mechanism 6 to be described. The nozzles 7, 7' are fed with the machining fluid from inlet conduits 8, 8'.

Disposed in bearing contact with the wire electrode 2 adjacent the upper and lower guide rollers are electrically conducting pins or rollers 9 and 9' which are electrically connected with one terminal of an EDM power supply (not shown) to energize the wire electrode 2. The workpiece 1 is electrically connected to the other terminal of the EDM power supply via a conductor (not shown). The EDM power supply is adapted to apply a succession of voltage pulses between the wire electrode 2 and the workpiece 1 to produce successive electrical discharges across a machining gap G (FIG. 2) formed therebetween in the cutting zone 4 and flushed with the machining fluid. The electrical discharges are consecutively produced to electroerosively remove stock from the workpiece 1 while the workpiece 1 is displaced transversely to the traveling electrode wire 2 between the wire-positioning elements 5 and 5' typically under commands of an NC (numerical control) unit so that the axis of the electrode wire 2 moves along a prescribed path p in the workpiece 1 to generate a desired finish-contour thereon corresponding to that path.

Figure 2:
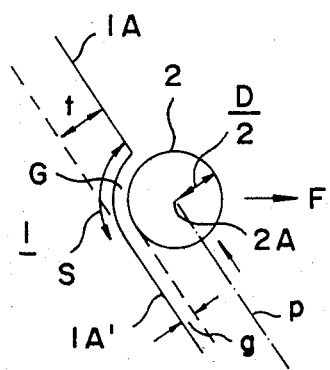
FIG. 2 is a plan view diagrammatically illustrating an electrode wire in the process of tangentially cutting a workpiece contour.

FIG. 2 shows the electrode wire 2 in the process of finish-cutting a rough-cut contour 1A in the workpiece 1 to generate a contour 1A' of a higher degree of, or a final, precision and finish thereon. It is shown that the electrode wire 2 traveling axially (in the direction vertical to the sheet of drawing) is moving horizontally with its axis along a path p while removing stock from the workpiece 1 with electrical discharges produced along the area S, thus leaving the machined contour 1A' behind on one side (left) of the path of movement p. In such a cutting process, the other side (right) of the electrode wire 2 is always open as shown because the depth of cut t is commonly less than (D+2 g) and typically less than D, where D is the diameter of the electrode wire 2 and g is the overcut, or the size of the machining gap G. The machining electrical discharges developed across and the machining fluid injected into, the gap entail considerable pressure which tends to move the wire 2 away from the area S in the direction of arrow F indicated and, since this pressure (which will be called "machining pressure" hereafter) fluctuates in magnitude, there results, in a plane transverse to the machining surface S, an irregular undulating motion of the electrode wire 2, viz. a fluctuation of the wire axis 2A in spite of the use of the wire-positoning guide members 5, 5' to maintain it precisely to fall on the prescribed path p. While this fluctuation is generally small in amplitude, it becomes no longer negligible where the machining surface finish required is as fine as 0.5 μRmax in roughness. Then it is necessary to limit the amplitude of fluctuation to less than 1 μm and preferably to less than 0.5 μm.

Figure 3:
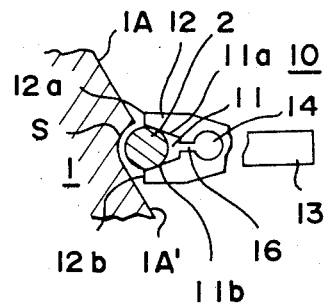
FIG. 3 is a cross-sectional view taken along III—III in FIG. 1.

Referring back to FIG. 1 and also with reference to FIG. 3, the rotary mechanism 6 according to the invention has a backing support member 10 for holding the traveling electrode wire 2 in the cutting zone 4 against fluctuating in its axial position as described. As shown in FIG. 3, the backing support member 10 is formed with a wire-reception groove 11, generally V-shaped in cross-section, comprising a pair of wire-bearing surfaces 11a and 11b, which in the cutting zone 4 extend in parallel to the straight-line path L established for the wire-axis 2A between the wire-positioning guide members 5 and 5' and are spaced form the path L by a distance which is equal to the radius D/2 of the electrode wire 2. It has been found essential that these surfaces 11a, 11b, each continuously extend over a substantial length vertically or parallel to the path L, the length being preferably at least fifty times greater than the diameter D of the electrode wire 2. In the illustrated embodiment, the V-shaped groove 11 is formed inside a bifurcated element 12 comprising parallel edges 12a, 12b, projected from a root portion 13 of the member 10. As shown, the V-shaped groove 11 is dimensioned to allow the electrode wire 2 to be guided as partially exposed, viz. with the active electrode surface thereof directly opposed with the workpiece surface S projecting over the edges 12a, 12b so as not to impair its machining action. In the embodiment illustrated in FIG. 1, a succession of such bifurcated elements, referenced 12A . . . , which are equally spaced apart, are supported on or projected from the root portion 13 of the member 10 and are arranged in the longitudinal direction of the traveling electrode wire 2 to extend over the cutting zone 4 defined between the upper and lower surface 1C, 1D of the workpiece 1 being cut. Alternatively, a single element 12 may extend over the cutting zone 4 or a portion thereof between these surfaces 1C, 1D, or such a portion extending above or below the upper or lower surface 1C or each element, 1D. The element 12 (12A) or at least portion thereof constituting the wire bearing surfaces 11a and 11b is composed of an electrically nonconductive and friction-resistant material such as rubby, sapphire, diamond or ceramic.

To help the electrode wire 2 to be retentively guided in bearing contact with the guide surfaces 11a and 11b, the member 10 in the illustrated embodiment has an internal bore 14 formed therein communicating a suction pump 15 with the wire-reception groove 11 via an opening 16 within the element 12 or each element 12A. With a valve 16a opened to connect the bore 14 with the suction source 15, a negative pressure is created in the groove 11 to tend to force the electrode wire 2 into pressure contact with the bearing surfaces 11a and 11b. The negative pressure is adjusted to allow the electrode wire 2 to travel smoothly in bearing contact with the supporting surfaces 11a and 11b.

Instead of the suction arrangement, the source 15 may be constituted by a pressurized source of the machining fluid to supply the machining fluid via the bore 14 and the groove 11 into the machining gap G to serve as the discharge medium. In this case, the machining fluid pressure-injected into the groove 11 acts as a pressure cushion for the traveling electrode wire to counterbalance the machining pressure.

As seen from FIG. 3, it is desirable to properly orient the wire backing support member 10 with respect to the machining surface S to ensure that the wire-bearing surfaces 11a and 11b are oriented so as to properly counterbalance or compensate for the machining pressure acting on the traveling electrode wire 2. It is also necessary to ensure that a collision of the member 10 with the workpiece 1 is avoided as such a collision would obstruct the cutting operation. Accordingly, the wire backing support member 10 is here rotatably mounted on a frame of the machine with the axis of rotation coinciding with the straight-line path L established between the wire-positioning guide members 5 and 5' for the wire axis 2A.

Thus, in the rotary mechanism 6 shown, the wire backing support member 10 is securely supported by a bow-shaped arm 17 having an upper and a lower arm member 18, 18' which in turn have tubular cylinders 19, 19' secured respectively thereto which are journaled to an upper and a lower arm 20, 20' of the machine via radial bearings 21 and 21', respectively. The arms 20, 20' may be horizontally extending parallel arms projecting from a column (not shown) which stands upright on the machine base (not shown). The upper cylinder 19, the upper arm member 18, the lower arm member 18' and the lower cylinder 19' are coaxially bored to accommodate the path of the electrode wire 2 between the upper and lower guide rollers 3, 3' and to allow the electrode wire 2 to freely move therethrough into the upper nozzle chamber 7 and the cutting zone 4, and from the cutting zone 4 and the lower nozzle chamber 7'. The upper and lower wire-positioning guide members 5 and 5' are securely arranged respectively within the bores of the upper and lower arm members 18 and 18' while the upper and lower nozzle chambers 7, 7' are securely carried on the arm 17. The upper and lower cylinders 19, 19' which are supported to be rotatable about the axis of rotation precisely coinciding with the straight-line path L have respective worm wheels 22, 22' secured thereto which are in mesh with worm shafts 23, 23' driven by motors 24, 24', respectively.

The motors 24, 24' are driven synchronously through the same angle, thus rotating the assembly 6 through a given angle of rotation. A driver circuit 25 for the motors 24, 24' is fed with a control signal 26, which may be derived from the numerical controller previously mentioned, to orient the wire backing support member 10 so as not to collide with the workpiece 1 and so as to hold, with the wire-bearing surfaces 11a and 11b, the traveling electrode wire 2 in the cutting zone 4 precisely in alignment with the straight-line path L established between the wire-positioning guide members 5 and 5', against the machining pressure tending to force it away from the prescribed path p. The rotation of the support member 10 causes the guide members 5, 5' to rotate about the rotary axis of the member 10 which is set to coincide with the straight-line path L so that there may result no deviation of the position of the wire axis 2A in the cutting zone 4 from the prescribed cutting path p.

What is claimed is:

1. A traveling-wire EDM method, comprising the steps of:
   positioning a contour of a conductive workpiece in juxtaposition with an electrode wire traveling axially along a straight-line path between a pair of wire-positioning guide members disposed at opposite sides of the workpiece;
   translationally advancing the axially traveling wire, generally tangentially along the workpiece contour while effecting electrical discharges in a cutting zone flushed with a machining fluid between the traveling wire and the conductive workpiece contour to cut a precision contour therein with a depth of cut being at most substantially equal to the diameter of the electrode wire whereby a fluctuating machining pressure caused between the traveling wire and an instantaneous area of contour being cut tends to force the traveling wire to undulate and laterally remove away from said straight-line path in an essentially unilateral open space flanking said contour being cut;

supporting said traveling wire tending to undulate, from behind with rigid surfaces of an element which are elongated substantially in parallel to said straight-line path but transverse to the workpiece between the wire-positioning guide members disposed at opposite sides of the workpiece, and disposed in bearing contact with said traveling wire at least partly in said cutting zone whereby undulations in the traveling wire are minimized, said element being carried on a rotary mechanism rotatable about its axis of rotation coinciding with said straight-line path; and rotating said rotary mechanism about said rotary axis to orient said element so as to oppose said wire-supporting surfaces with said instantaneous area of contour being cut and to avoid a collision of said element with the workpiece.

2. The method defined in claim 1 wherein said surfaces each have a wire-bearing length at least fifty times the diameter of said electrode wire in parallel to said straight-line path.

3. A traveling-wire EDM apparatus, comprising:
a pair of wire-positioning guide members for establishing a straight-line path therebetween to be traveled axially by an electrode wire in spaced-juxtaposition with a contour of a conductive workpiece straddled by said guide members which are located on opposite sides of said workpiece;

means for effecting a relative displacement between the workpiece and the guide members to translationally advance the traveling wire, generally tangentially along the workpiece contour while electrical discharges are effected in a cutting zone flushed with a machining fluid between the traveling wire and the conductive workpiece contour to cut a precision contour therein with a depth of cut being at most substantially equal to the diameter of the electrode wire whereby a fluctuating machining pressure caused between the traveling wire and an instantaneous area of contour being cut tends to force the traveling wire to undulate and laterally remove away from said straight-line path in an essentially unilateral open space flanking said contour being cut;

a rotary mechanism having an element carried thereon which has rigid wire-supporting surfaces that are elongated substantially in parallel to said straight line path but transvese to the workpiece between the wire-positioning guide members disposed at opposite sides of the workpiece, and disposed in bearing contact with the traveling wire at least partly in said cutting zone whereby undulations in the traveling wire are minimized, said mechanism being rotatable about its axis of rotation coinciding with said straight-line path; and means for rotating said mechanism about said rotary axis to orient said element so as to oppose said wire-supporting surfaces with said instantaneous area of contour being cut and to avoid a collision of said element with the workpiece.

4. The apparatus defined in claim 3 wherein said surfaces each have a wire-bearing length at least fifty times the diameter of said electrode wire in parallel to said straight-line path.

5. A traveling-wire EDM apparatus, comprising:
a pair of wire-positioning guide members for establishing a straight-line path therebetween to be traveled axially by an electrode wire in spaced-juxtaposition with a contour of a conductive workpiece;

means for effecting a relative displacement between the workpiece and the guide members to translationally advance the traveling wire, generally tangentially along the workpiece contour while electrical discharges are effected in a cutting zone flushed with a machining fluid between the traveling wire and the conductive workpiece contour to cut a precision contour therein with a depth of cut being at most substantially equal to the diameter of the electrode wire whereby a fluctuating machining pressure caused between the traveling wire and an instantaneous area of contour being cut tends to force the traveling-wire to undulate and laterally remove away from said straight-line path in an essentially unilateral open space flanking said contour being cut;

a rotary mechanism having an element carried thereon which has rigid surfaces that are elongated substantially in parallel to said straight line path and disposed in bearing contact with the traveling wire at least partly in said cutting zone whereby undulations in the traveling wire are minimized, said mechanism being rotatable about its axis of rotation coinciding with said straight-line path;

means for rotating said mechanism about said rotary axis to orient said element so as to oppose said wire-supporting surfaces with said instantaneous area of contour being cut and to avoid a collision of said element with the workpiece, said wire-supporting surfaces being arranged to constitute an elongate wire reception groove essentially V-shaped in cross section, said element being formed with an inner bore opening to said groove; and suction means connected to said bore for applying in said groove a negative pressure tending to retain the traveling wire in said groove.

6. The apparatus defined in claim 5 wherein said surfaces each have a wire-bearing length at least fifty times the diameter of said electrode wire in parallel to said straight-line path.

7. A traveling-wire EDM apparatus, comprising:
a pair of wire-positioning guide members for establishing a straight-line path therebetween to be traveled axially by an electrode wire in spaced-juxtaposition with a contour of a conductive workpiece;

means for effecting a relative displacement between the workpiece and the guide members to translationally advance the traveling wire, generally tangentially along the workpiece contour while electrical discharges are effected in a cutting zone flushed with a machining fluid between the traveling wire and the conductive workpiece contour to cut a precision contour therein with a depth of cut being at most substantially equal to the diameter of the electrode wire whereby a fluctuating machining pressure caused between the traveling wire and an instantaneous area of contour being cut tends to force the traveling wire to undulate and laterally remove away from said straight-line path in an essentially unilateral open space flanking said contour being cut;

a rotary mechanism having an element carried thereon which has rigid surfaces that are elongated substantially in parallel to said straight line path and disposed in bearing contact with the traveling wire at least partly in said cutting zone whereby undulations in the traveling wire are minimized, said mechanism being rotatable about its axis of rotation coinciding with said straight-line path;

means for rotating said mechanism about said rotary axis to orient said element so as to oppose said wire-supporting surfaces with said instantaneous area of contour being cut and to avoid a collision of said element with the workpiece, said wire-supporting surfaces being arranged to constitute an elongate wire reception groove essentially V-shaped in cross section and said element being formed with an inner bore opening to said groove; and a pressurized source of said machining fluid connected to said bore for applying in said groove a positive pressure tending to counterbalance said machining pressure exerted on the traveling wire.

8. The apparatus defined in claim 7 wherein said surfaces each have a wire-bearing length at least fifty times the diameter of said electrode wire in parallel to said straight-line path.

* * * * *